No. 614,173. Patented Nov. 15, 1898.
J. T. KELLY.
HANDLE FOR BUCKETS, &c.
(Application filed May 25, 1898.)
(No Model.)

Witnesses
Inventor
John T. Kelly
By John D. Hyer
Attorney

UNITED STATES PATENT OFFICE.

JOHN T. KELLY, OF ALBANY, NEW YORK, ASSIGNOR OF ONE-HALF TO JOHN M. COLLINS, OF SAME PLACE.

HANDLE FOR BUCKETS, &c.

SPECIFICATION forming part of Letters Patent No. 614,173, dated November 15, 1898.

Application filed May 25, 1898. Serial No. 681,698. (No model.)

*To all whom it may concern:*

Be it known that I, JOHN T. KELLY, a citizen of the United States, residing at Albany, in the county of Albany and State of New York, have invented certain new and useful Improvements in Handles for Buckets, &c.; and I do hereby declare the following to be a full, clear, and exact description of the invention, such as will enable others skilled in the art to which it appertains to make and use the same.

The invention relates to handles for buckets and other articles; and it consists of a handle that may be easily and readily applied to or removed from a finished or completed bail, wire, cord, or other device on which it is desirable that a handle should be used.

The objects of the invention are to so construct a handle that it may be applied by simply forcing the wire or bail to its seat in the handle through a slot in the handle, which closes automatically after the wire has been inserted.

I will now proceed to describe the invention and manner of using the same in such full, clear, concise, and exact terms that any person familiar with the art may make, construct, and use the same.

Figure 1:
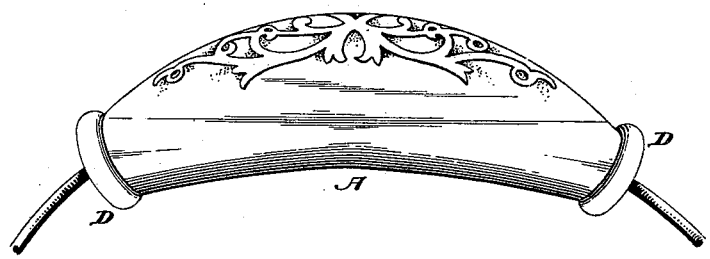
Figure 2:
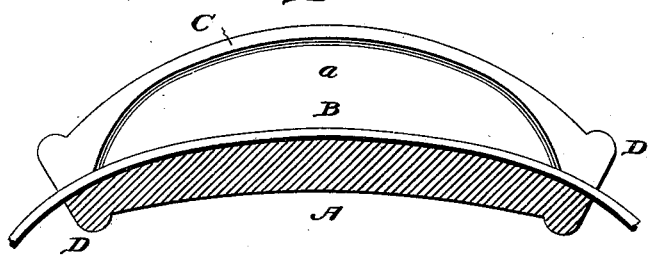
Figure 3:
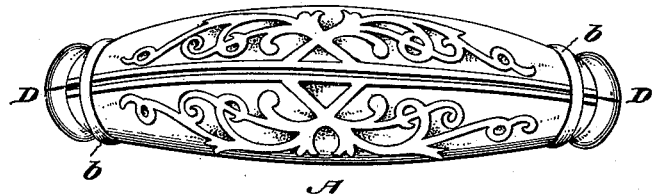
Figure 4:
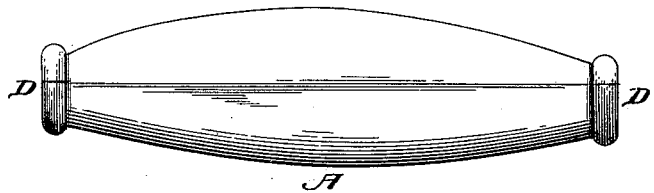

Referring to the drawings forming a part of this specification and on which like letters of reference indicate corresponding parts in the different views, Figure 1 is a side elevation of the handle applied to an ordinary wire bail. Fig. 2 is a central longitudinal section. Fig. 3 is a view of the top of the handle, showing the slit, and a band at each end to hold the slit tightly closed; and Fig. 4 is a side elevation of a straight handle.

The handle is preferably formed of rubber or rubber compound, although it may be made of any material that has sufficient elasticity or resiliency, such as papier-mâché, for example.

The handle is of the usual form in outline—that is to say, of a shape most suitable to be grasped by the hand—although the peculiar configuration is not material and is not of the essence of the invention. I have shown two forms in the drawings—viz., a longitudinally-curved handle, as in Figs. 1, 2, and 3, or a straight handle, as in Fig. 4.

A represents the handle proper. It is preferably of greatest diameter in the center and tapers toward each end. Its longitudinal axis is formed with an aperture or groove B, which forms a seat for the wire. Below this aperture B the handle is solid and of course with a closed bottom. From the bore or aperture B and extending to the top of the handle it is slitted, as shown at C, and this slit is normally closed on account of the elasticity or resiliency of the material from which the handle is constructed. The slit C extends from end to end of the handle and radially about half its diameter.

The handle is preferably formed with beads or annular flanges D D, one at each end of the handle.

For economy of material I prefer to form the top portions of the handle above the axial bore or aperture partially hollow, as shown *a*. This construction also renders the handle somewhat more resilient and more easily applied over the wire or bail. When it is desired to hold the edges adjacent to the slit C very close or tight at the top, I sometimes use elastic bands *b b* near the ends of the handles.

The handle may be made hollow above the axial bore or aperture, as just above described, or it may be merely formed with a slit, as already explained, which extends from the aperture B to the top of the handle.

The manner of using the handle will be readily seen. The slit at the top is opened sufficiently to insert the wire or bail, which latter is seated in the aperture or bore B, and the slot closes automatically by virtue of the resiliency or elasticity of the material of which the handle is formed. The bands *b b* may then be applied or not, as may be desired.

The handle may be applied to a variety of articles while new and after full completion in other respects, or it may be used to replace broken or worn-out handles and is applied to pails, bundle or package carriers, &c.

The invention is very easily applied by any one, very economical in manufacture, and very neat and effective in use.

Slight modifications within the scope of the invention may be made without departing from the spirit or sacrificing any of the advantages thereof.

Having thus fully described the invention, what I claim as new, and desire to secure by Letters Patent, is—

1. A handle for buckets and other articles composed of elastic or resilient material, having a longitudinal aperture or bore for a wire or cord, and a slit extending from said bore to the top of the handle and normally closed, substantially as described.

2. A handle for buckets and other articles composed of elastic or resilient material with a central longitudinal seat or bore for the wire or cord, a normally-closed slit extending from said bore to the top of the handle, the handle being solid below said seat or bore, substantially as described.

3. A handle for buckets and other articles composed of elastic or resilient material with a central longitudinal bore, a solid or closed bottom portion, said handle slitted from the top to the central bore, and end clamps or rings, substantially as described.

In testimony whereof I affix my signature in presence of two witnesses.

JOHN T. KELLY.

Witnesses:
GEORGE H. FREDERICK,
JOHN F. HUBER.